United States Patent
McNeff et al.

(10) Patent No.: US 8,424,451 B2
(45) Date of Patent: Apr. 23, 2013

(54) AUTOMATICALLY CONTROLLED STEAM FLAKING SYSTEMS AND METHODS

(75) Inventors: Larry C. McNeff, Anoka, MN (US);
Clayton V. McNeff, Andover, MN (US);
Peter G. Greuel, Anoka, MN (US)

(73) Assignee: Sartec Corporation, Anoka, MN (US)

(*) Notice: Subject to any disclaimer, the term of this patent is extended or adjusted under 35 U.S.C. 154(b) by 1406 days.

(21) Appl. No.: 11/107,379

(22) Filed: Apr. 15, 2005

(65) Prior Publication Data

US 2005/0236131 A1 Oct. 27, 2005

Related U.S. Application Data

(60) Provisional application No. 60/565,100, filed on Apr. 23, 2004.

(51) Int. Cl.
*A23N 17/00* (2006.01)
(52) U.S. Cl.
USPC .............. 99/488; 99/487; 99/516; 99/536
(58) Field of Classification Search .......... 99/488, 99/487, 536, 516
See application file for complete search history.

(56) References Cited

U.S. PATENT DOCUMENTS

| | | | | |
|---|---|---|---|---|
| 4,055,673 A | * | 10/1977 | Mueller et al. | 426/231 |
| 4,750,530 A | * | 6/1988 | Helle et al. | 141/1 |
| 5,194,275 A | * | 3/1993 | Greer | 426/231 |
| 5,598,770 A | | 2/1997 | Campbell et al. | |
| 5,637,340 A | * | 6/1997 | Greer | 426/456 |
| 6,025,814 A | * | 2/2000 | Nelson et al. | 343/878 |
| 6,056,822 A | * | 5/2000 | Jefferson et al. | 118/683 |
| 6,428,831 B1 | | 8/2002 | Brown | |
| 6,440,475 B1 | * | 8/2002 | McNeff et al. | 426/231 |
| 6,494,164 B2 | * | 12/2002 | Heinzl et al. | 119/51.02 |
| 6,516,710 B1 | * | 2/2003 | Knight et al. | 99/348 |
| 6,586,028 B1 | | 7/2003 | Brown | |

OTHER PUBLICATIONS

Zinn et al., "Flaking Corn: Processing Mechanics, Quality Standards, and Impacts on Energy Availability and Performance of Feedlot Cattle," *J. Anim. Sci.* 2002, 80:1145-1156.

* cited by examiner

*Primary Examiner* — Reginald L Alexander
(74) *Attorney, Agent, or Firm* — Pauly, Devries, Smith & Deffner, L.L.C.

(57) ABSTRACT

The invention is related to an apparatus and method for controlling a steam flaking operation. In an embodiment, the invention is a steam flaking system including at least one sensor to measure the flow of material in the steam flaking system, a steam chest, a peg feeder, disposed at the bottom of the steam chest, and an automatic control unit, wherein the automatic control unit receives data from the at least one sensor and controls the peg feeder. In an embodiment, the invention is a steam flaking system including a steam chest, at least one sensor to measure the flow of material in the steam chest, a peg feeder, and an automatic control unit, wherein the automatic control unit receives data from the at least one sensor and controls the peg feeder. In an embodiment, the invention is a method for automatically controlling the residence time of a product in a steam chest including the steps of calculating a residence time (Tr) of a product, calculating a desired peg feeder RPM based on a calibration curve relating RPM and residence time, and adjusting the RPM of the peg feeder to the desired amount.

13 Claims, 3 Drawing Sheets

AUTOMATICALLY CONTROLLED STEAM FLAKING SYSTEMS AND METHODS

CROSS REFERENCE TO RELATED APPLICATIONS

This application claims the benefit of U.S. Provisional Application Ser. No. 60/565,100, filed Apr. 23, 2004, which application is incorporated herein by reference in its entirety.

FIELD OF THE INVENTION

The invention is related to an apparatus and method for controlling a steam flaking operation. More specifically, the invention is related to an automated system and method for controlling the residence time of a product within a steam chest in a steam flaking operation.

BACKGROUND OF THE INVENTION

The purpose of steam flaking is to make more starch available for digestion in a given animal and thereby improve the feeding efficiency (pounds fed/pound of gain). Properly steamed grains help an animal to convert insoluble starches into sugar. Transforming the grain into a thin flake ruptures a protein matrix encapsulating starch granules and allows a greater amount of starch to be utilized by the animal during the limited time it is passing through the digestive system.

In the case of cereal grains, the hot cooked starch granules are ruptured, making the starch more available in livestock digestion. This process increases the gelatinization value of the grain. Protein beans that have been steam cooked and flaked offer increased exposure of oil (fats), destruction of some protein inhibitors, and exposure of more surface area.

The product to be flaked is cooked in a steam chest for 20-150 minutes at 200-210° F. to allow moisture and heat to penetrate the kernel or the bean. It is then fed into a flaking mill with corrugated rolls. These rolls have a set gap clearance to draw the product into the rolls which flatten and imprint the flakes. The rolls are typically 18" to 32" in diameter and from 24" to 68" in length. The longer the roll, the greater the production capacity. Varying cooking times, flake thickness, and moisture uptake, will affect the final feed enhancement for various classes of livestock.

At a given peg feeder setting, the grain movement through a steam chest can vary markedly when the amount of steam being added is varied. The amount of steam being added at the different points along the steam chest is usually controlled by hand valves. Usually the steam valves are opened at the beginning of each day and the chest is allowed to heat up. When the grain is brought up to the desired temperature, the valves are then closed and the system is turned on to flake the grain. Then the operator watches the steam chest temperature and changes the steam valve settings to keep the desired temperature, and monitors the quality of the flakes and makes adjustments as deemed necessary. The amount of steam added is controlled manually by the mill operator.

Therefore, a need exists for systems and methods for automatically controlling steam flaking operations.

SUMMARY OF THE INVENTION

In an embodiment, the invention is a steam flaking system including at least one sensor to measure the flow of material in the steam flaking system, a steam chest, a peg feeder, disposed at the bottom of the steam chest, and an automatic control unit, wherein the automatic control unit receives data from the at least one sensor and controls the peg feeder. In an embodiment, the invention is a steam flaking system including a steam chest, at least one sensor to measure the flow of material in the steam chest, a peg feeder disposed at the bottom of the steam chest, and an automatic control unit, wherein the automatic control unit receives data from the at least one sensor and controls the peg feeder. In an embodiment, the invention is a method for automatically controlling the residence time of a product in a steam chest including the steps of calculating a residence time (Tr) of a product, calculating a desired peg feeder RPM based on a calibration curve relating RPM and residence time, and adjusting the RPM of the peg feeder to the desired amount.

The above summary of the present invention is not intended to describe each discussed embodiment of the present invention. This is the purpose of the figures and the detailed description that follows.

DRAWINGS

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

In an embodiment, the invention is a steam flaking system including a bin, at least one sensor to measure the flow of material in the bin, a steam chest in fluid communication with the bin, a peg feeder disposed at the bottom of the steam chest, and an automatic control unit, wherein the automatic control unit receives data from the at least one sensor and controls the peg feeder. In an embodiment, the invention is a steam flaking system including a steam chest, at least one sensor to measure the flow of material in the steam chest, a peg feeder disposed at the bottom of the steam chest, and an automatic control unit, wherein the automatic control unit receives data from the at least one sensor and controls the peg feeder. In an embodiment, the invention is a method for automatically controlling the residence time of a product in a steam chest including the steps of calculating a residence time (Tr) of a product, calculating a desired peg feeder RPM based on a calibration curve relating RPM and residence time, and adjusting the RPM of the peg feeder to the desired amount.

In an embodiment, the invention is an automated control system that allows users to set a desired steam chest residence time into a PLC or control computer and the system then automatically achieves this residence time by means of a feed back loop controller. In an embodiment, the invention provides automatic control of the peg feeder to control the amount of residence time that the grain experiences within the steam chest. In an embodiment, the controller produces a custom report for each user that reports the cost per bushel of the grain being steam flaked as well as the average, high and low residence time of the grain in the steam chest. In an embodiment, the invention allows one to measure and adjust the residence time on a semi-continuous basis. In an embodiment, the invention allows for periodic, semi-continuous, or continuous measurement of the flow rate of the grain through the steam chest that is then fed back to a controller that calculates a target RPM setting for the peg feeder, and then controls the peg feeder to achieve the desired target RPM. The RPM control is then monitored and controlled to stay within a deadband setting until a new flow measurement is made and the cycle is started again.

Figure 1:
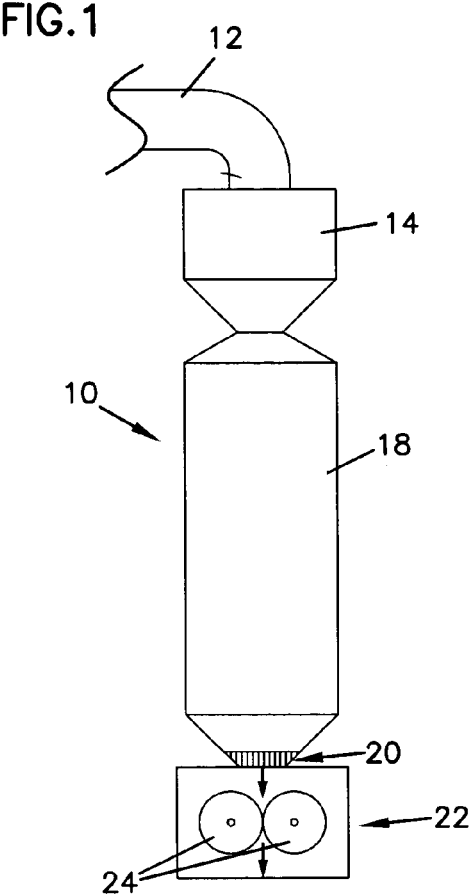
FIG. 1 is a schematic view of a typical steam flaking operation.

Referring now to FIG. 1, a schematic view of a steam flaking operation 10 is shown. In an embodiment, the product to be steam-flaked moves through a supply conduit 12 into the surge bin 14. However, the product may also be provided through other supply means. In an embodiment, the product is supplied to the surge bin 14 discontinuously. The product to be steam-flaked may include a variety of grains, plant products, and animal feeds. The product then moves from the surge bin into the steam chest 18. While in the steam chest the product is exposed to conditions of high temperature and high moisture. After spending a certain amount of time in the steam chest 18, an amount of time referred to herein as the residence time, the now steamed product is emptied by a peg feeder 20. In an embodiment the peg feeder rotates bringing an amount of steamed product from the steam chest 18 to the flaking mill 22 with each rotation. After entering the flaking mill 22, the product passes through flaking rollers 24, where the product is sheared and transformed under pressure into flakes.

Figure 3:
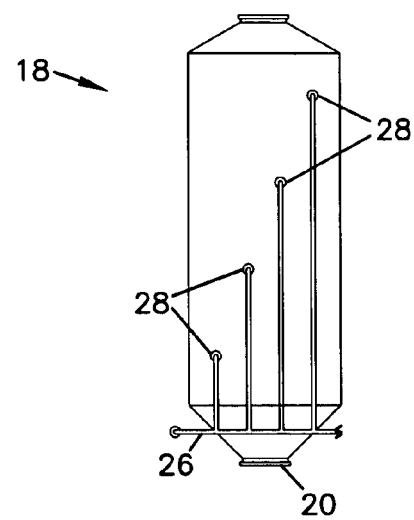
FIG. 3 is a back-view of the exterior of a steam chest.
Figure 2:
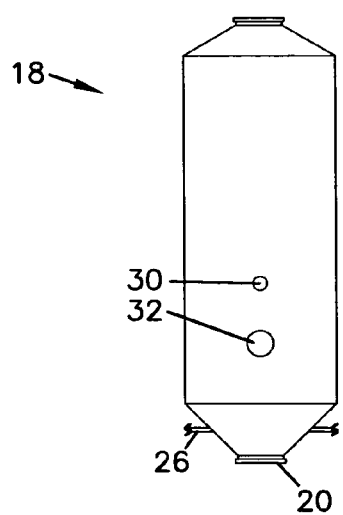
FIG. 2 is a front-view of the exterior of a steam chest.

Referring now to FIG. 2, a front-view is shown of the exterior of an exemplary steam chest that sits on top of a roller assembly that flakes the grain. Typically, the product enters the steam chest and is heated by steam being injected into the chest. The steam travels through a steam supply line 26 and enters the steam chest through a plurality of steam insertion points 28 (as shown in FIG. 3). The steam "cooks" the product as it moves through the chest. The precise rate that the grain moves through the chest is controlled by the peg feeder 20. In some embodiments, the steam chest is at atmospheric pressure. The temperature inside the steam chest is monitored by use of a temperature gauge 30. The visual appearance of the product can also be monitored through a sighting glass 32.

Figure 4:
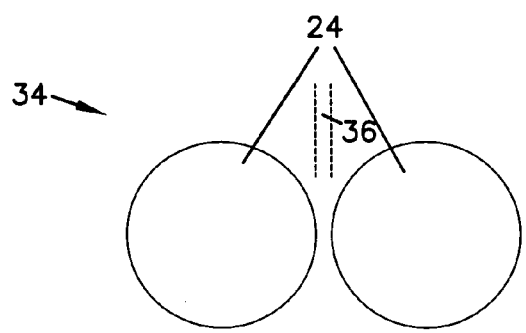
FIG. 4 is a schematic view of flaking rollers in operation.

Referring now to FIG. 4, after the product has traveled through the steam chest it passes through the peg feeder (not shown) and enters the interior 34 of the flaking mill. The flaking mill has a plurality of rollers 24. The tension on the rollers 24, as well as the roller gap 36 on the steam flaker, determine the bushel weight of the steam flaked grain. The tension on the rollers 24 and the roller gap 36 also control the rate at which the grain can travel through the rollers. Typically, the roller speed is constant.

A controllable parameter of the steam flaking process is the amount of time that the product spends in the steam chest before it passes through the rollers, referred to herein as residence time. Too short a residence time leads to product that never gets hot enough to increase the starch availability of the product, while too long a residence time leads to excessive cost because of wasted steam production.

Figure 5:
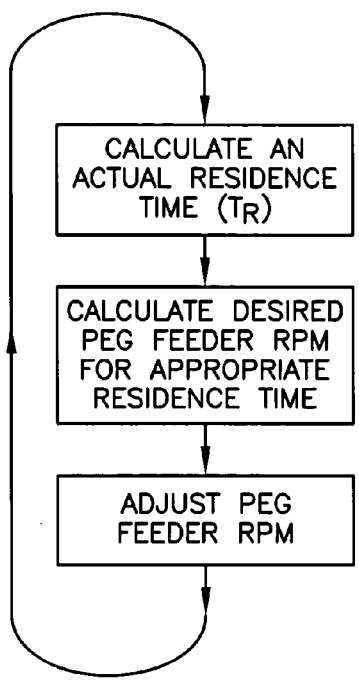
FIG. 5 is a flow chart showing operations performed by an automated steam flaking control system in accordance with an embodiment of the invention.

In an embodiment, a desired residence time can be automatically adjusted for and achieved by measuring the rate at which grain is entering the steam chest and then adjusting the rotation speed of the peg feeder appropriately. In an embodiment, the residence time can be calculated by the equation:

$$Tr=(Tz/Vz)\times(Vsc)$$

Wherein Tr is the calculated residence time of the grain in the steam chest; Tz is the time it takes for the grain to empty from a particular zone of the surge bin; Vz is the volume of the zone in the surge bin; and Vsc is the volume of the steam chest. Referring now to FIG. 5, Tz can be empirically determined. By way of example, this can be done through the use of various indicators in the surge bin. Thus, as product enters the steam chest from the surge bin, indicators in the surge bin measure the length of time (Tz) required for the grain to empty from a given zone. Vz is known based on the particular surge bin being used. These two variables are then used along with the volume of the steam chest in order to calculate the residence time (Tr) of the product according to the equation above. However, it will be appreciated that indicators to measure Tz can be positioned at other points in the steam flaking system. For example, various types of indicators or sensors can be positioned in the steam chest itself.

One of skill in the art will appreciate that Tr can also be determined in other ways. For example, sensors can be used that directly measure the flow rate of grain. By way of example, such sensors include impact plates and Doppler-effect sensors. Doppler-effect sensors generally operate by generating a uniform field in the microwave frequency range and measuring flow rate based on the reflection of microwaves by passing particles. An exemplary Doppler-effect sensor is the MF 3000 available from Mutec Instruments GmbH, Seevetal-Ramelsloh, DE. Flow rate sensors can be positioned at various points in the steam flaking apparatus. For example, they can be positioned in the surge bin, in a supply line, in the steam chest, etc. Once the flow rate (Fg) of the grain is known, Tr can be calculated according to $Tr=Vsc/Fg$.

Additionally, Tr can be calculated by adding an indicator composition to the flow of material, and then monitoring to see how long it takes that indicator composition to reach a predetermined point downstream in the steam flaking apparatus. For example, a sensor that can detect the indicator composition can be used downstream of the point where the indicator composition is added. In an embodiment, the indicator composition can be added to the flow of grain automatically on a periodic or ad hoc basis. It will be appreciated that the indicator composition can be many different things. For example, the indicator composition could be a dye and the sensor could be configured to detect the dye in the flow of material. As another example, the indicator composition could be a salt solution and the sensor could be configured to detect a change in the conductivity level in the flow of material. As a further example, the indicator composition could have phosphorescent properties and the sensor could be configured to detect phosphorescence. In these configurations, the indicator composition could be added at various points in the steam flaking process including at or before the surge bin, in the steam chest, etc. In these configurations, the sensor for detecting the indicator composition could be located at various points in the steam flaking process downstream of where the indicator composition is being added. After determining the amount of time for the material to move from one point in the system to another, flow rate can be calculated. Flow rate (Fg) can then be used to calculate residence time (Tr) based on the volume of the steam chest (Vsc).

In an embodiment, after Tr is calculated, it is compared to the target residence time input into the system by a user and a desired peg feeder RPM is calculated based on a calibration curve or plot line relating RPM and residence time. The calibration curve relating RPM and residence time may be put in the system at the time that the steam flaking mill, or the automatic control system of the steam flaking mill, is installed.

The RPM versus Residence Time calibration curve(s) are empirically measured for different steam valve settings and steam chest temperatures. It is believed the slope of RPM versus Residence Time may be the same for different steam valve settings and the lines will differ by only a constant value (intercept value). After the system calculates a new target RPM setting based on the measured residence time, the RPM setting can be incrementally changed to make the actual RPM and target RPM approximately equal and therefore attain the desired user input residence time.

Figure 6:
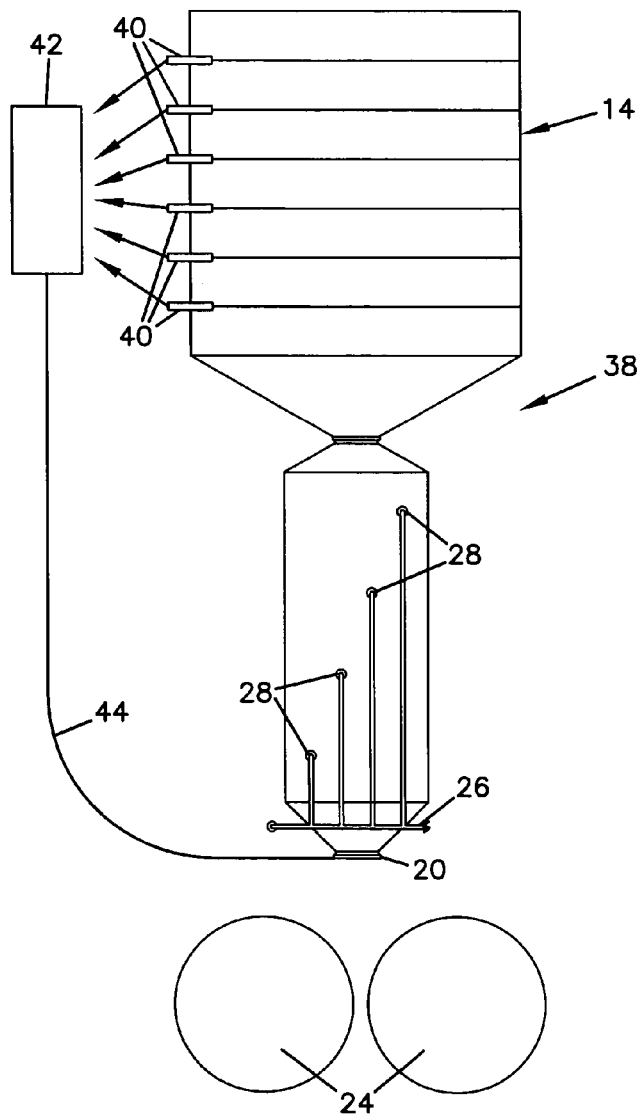
FIG. 6 is a schematic view of a steam flaking operation in accordance with an embodiment of the invention.

Referring now to FIG. 6, a schematic view of a steam flaking operation 38 in accordance with an embodiment of the invention is shown. In an embodiment, the invention uses bindicators 40 set at different heights in the surge bin 14. In an embodiment, the bindicators detect whether or not product is at the level of the given bindicator in the surge bin. One of skill in the art will appreciate that many different types of bindicators can be used without deviating from the spirit of the invention. By way of example, bindicators can be based on microwaves, sonic energy (sonar), conductivity, optics, infrared radiation, proximity etc.

In other embodiments, the invention can use any transducer or sensor that can measure the change in distance from the top of the surge bin to the level of the product in a continuous manner. For example, sonic (sonar), microwave, laser, infrared based transducers that continuously measure the distance between the top of the surge bin and level of the product can be used.

In an embodiment, data gathered by the bindicators 40, or other sensors as described above, are fed into a controller unit 42. The calculations previously described are performed by the controller unit 42, which then controls the rotation speed of the peg roller 20 via a control connection 44. One of skill in the art will appreciate that the control connection may be wired or wireless.

In some embodiments, the flow of product into the surge bin is discontinuous and a sensor in the supply conduit is connected to the controller unit 42. This is so that the addition of product through the supply conduit does not interfere with calculations made the controller unit 42.

One of skill in the art will appreciate that measurement of the flow of product can occur in other places in the steam flaking system besides the surge bin. By way of example, another bin could be set up before the surge bin and bindicators or flow sensors could be used in that bin to measure the flow rate of the product. Alternatively, the flow rate could be measured via a device in the supply conduit. Also, the flow of product can be measured in the steam chest itself. Measurement of the flow of product can be direct or indirect.

Figure 7:
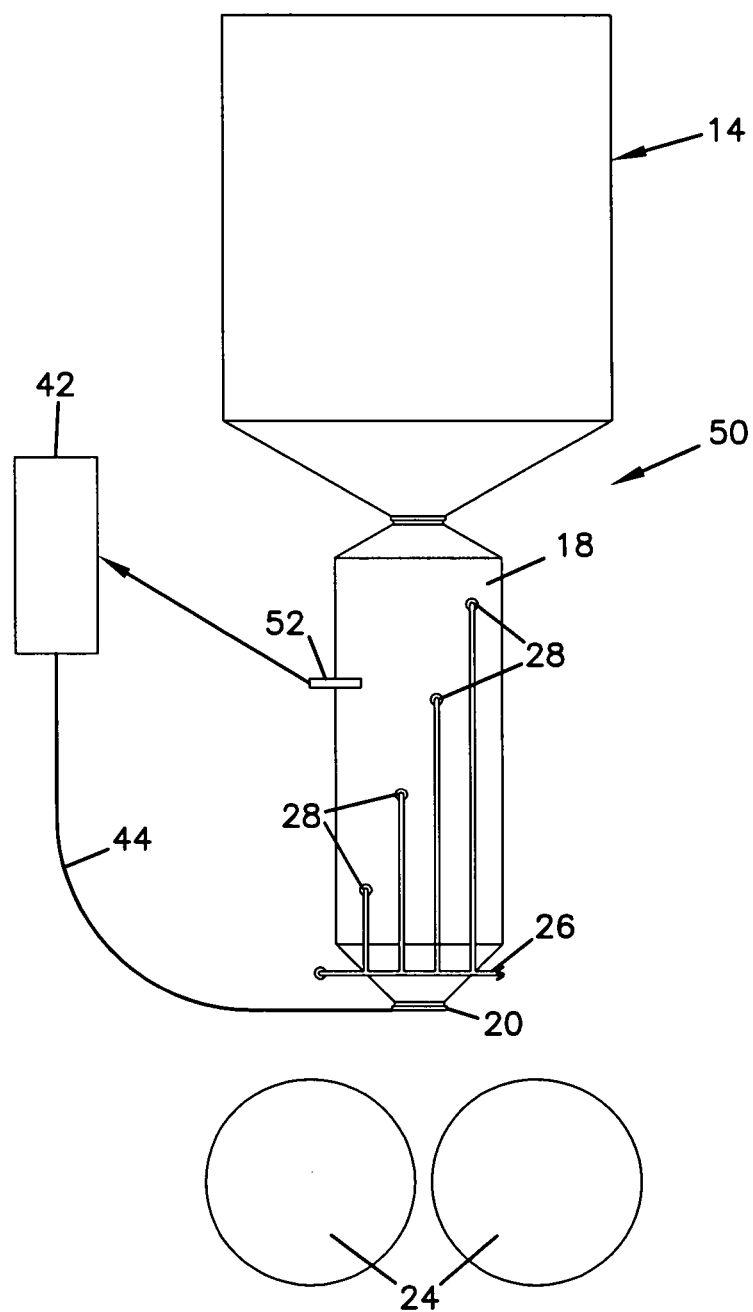
FIG. 7 is a schematic view of a steam flaking operation in accordance with another embodiment of the invention.

Referring now to FIG. 7, a schematic view of a steam flaking operation 50 in accordance with another embodiment of the invention is shown. In an embodiment, the invention uses a sensor 52 to measure the material flow rate in the steam chest 18. One or more sensors can be used. The material flow rate can be measured directly or indirectly. For example, a type of flow meter could be used to measure material flow rate directly. As a further example, the time for an indicator composition to travel from one point in the system to another could be used to measure material flow rate indirectly. Material flow rate can be used to determine residence time Tr as described above. In this embodiment, data gathered by the sensor 52 is fed into a controller unit 42. The calculations previously described are performed by the controller unit 42, which then controls the rotation speed of the peg roller 20 via a control connection 44. One of skill in the art will appreciate that the control connection can be wired or wireless.

In some embodiments, the invention includes other transducers such as thermocouples to measure the chest temperature, automated steam valve controllers, and a gas flow meter that could measure the amount of natural gas being used to produce the steam in a boiler.

In some embodiments, the control unit produces a custom report that provides the cost of steam flaking per bushel or ton of grain processed and further provides information regarding the average residence time of the grain within each steam chest. In an embodiment, the control unit is connected via a modem to information gateways, such as the Internet, so that the information and/or the generated reports can be automatically transferred to a remote monitoring facility for further processing.

While the present invention has been described with reference to several particular implementations, those skilled in the art will recognize that many changes may be made hereto without departing from the spirit and scope of the present invention.

We claim:

1. A steam flaking system comprising:
a plurality of sensors to measure the flow rate of material in the steam flaking system,
a steam chest,
a peg feeder, disposed at the bottom of the steam chest, and an automatic control unit, and
a calibration curve comprising data relating rotations per minute of the peg feeder and a residence time of grain within the steam chest, the calibration curve data stored within the automatic control unit;
wherein the automatic control unit is configured to receive data from the plurality of sensors and controls the peg feeder, wherein the automatic control unit is configured to calculate the residence time using the equation Tr=Vsc/Fg.

2. The steam flaking system of claim 1, further comprising a flaking mill, operatively connected to the peg feeder.

3. The steam flaking system of claim 1, at least one of the plurality of sensors positioned in a bin, the bin positioned upstream of the steam chest.

4. The steam flaking system of claim 3, wherein the bin comprises a surge bin.

5. The steam flaking system of claim 1, the plurality of sensors comprising a sensor positioned in the steam chest.

6. The steam flaking system of claim 1, wherein at least one of the plurality of sensors measures the flow of material in the steam flaking system directly.

7. The steam flaking system of claim 1, wherein at least one of the plurality of sensors measures the flow of material in the steam flaking system indirectly.

8. The steam flaking system of claim 1, wherein the sensors comprise bindicators.

9. The steam flaking system of claim 1, wherein the at least one of the plurality of sensors is selected from the group consisting of optical, chemical, mechanical, proximity, and sonar sensors.

10. The steam flaking system of claim 1, wherein at least one of the plurality of sensors comprises a flow meter.

11. The steam flaking system of claim 1, wherein at least one of the plurality of sensors comprises a Doppler-effect flow meter.

12. The steam flaking system of claim 1, wherein the control unit controls a rotation speed of the peg feeder.

13. A steam flaking system comprising:
a plurality of sensors to measure the flow rate of material in the steam flaking system,
a steam chest,
a peg feeder, disposed at the bottom of the steam chest, and
an automatic control unit, and
a calibration curve comprising data relating rotations per minute of the peg feeder and a residence time of grain within the steam chest, the calibration curve data stored within the automatic control unit;
wherein the automatic control unit is configured to receive data from the plurality of sensors and control the peg feeder, wherein the automatic control unit is configured to calculate the residence time using the equation $Tr=(Tz/Vz) \times (Vsc)$.

\* \* \* \* \*